United States Patent
Busse-Grawitz et al.

(10) Patent No.: US 10,069,383 B2
(45) Date of Patent: Sep. 4, 2018

(54) ELECTRONICALLY COMMUTED ELECTRIC MOTOR WITH DIRECT SAMPLING OF THE MAGNETIC FIELD OF THE ROTOR

(71) Applicant: Lakeview Innovation Ltd., Buochs (CH)

(72) Inventors: Max Erick Busse-Grawitz, Alpnach Dorf (CH); Stefan Imfeld, Giswil (CH)

(73) Assignee: LAKEVIEW INNOVATION LTD., Buochs (CH)

(*) Notice: Subject to any disclaimer, the term of this patent is extended or adjusted under 35 U.S.C. 154(b) by 220 days.

(21) Appl. No.: 15/078,388

(22) Filed: Mar. 23, 2016

(65) Prior Publication Data

US 2016/0285347 A1  Sep. 29, 2016

(30) Foreign Application Priority Data

Mar. 25, 2015 (EP) .................................. 15000875

(51) Int. Cl.
*H02K 11/00* (2016.01)
*H02K 11/215* (2016.01)
(Continued)

(52) U.S. Cl.
CPC ........... *H02K 11/215* (2016.01); *H02K 29/08* (2013.01); *H02K 1/2773* (2013.01)

(58) Field of Classification Search
CPC .............................. H02K 11/215; H02K 11/24
(Continued)

(56) References Cited

U.S. PATENT DOCUMENTS 5,864,192 A * 1/1999 Nagate .................. H02K 29/08
310/156.05
6,713,981 B2 * 3/2004 Nakajima ................. H02P 6/16
310/156.05
(Continued)

FOREIGN PATENT DOCUMENTS

DE          298 02 297 U1   4/1998
DE    10 2007 060 241 A1   6/2009
(Continued)

OTHER PUBLICATIONS

Search Report dated Sep. 16, 2015, by the European Patent Office for Application No. 15000875.3.

*Primary Examiner* — Hanh Nguyen
(74) *Attorney, Agent, or Firm* — Buchanan Ingersoll & Rooney PC

(57) ABSTRACT

An electronically commuted electric motor with a stator and a rotor is disclosed that has permanent magnets distributed a circumferential direction to determine the magnetic field of the rotor, whereby at least one sensor makes the position or speed of the rotor recordable through direct sampling of the magnetic field of the rotor. The sensor is spaced from the stator in a way that the stator field is recorded by the sensor only to a low extent or not at all, and whereby magnetic flux-guiding elements are disposed on a front side of the rotor, which move along with the rotor and guide at least a part of the magnetic field of the rotor to the sensor. The flux-guiding elements viewed in the circumferential direction of the rotor are positioned respectively between two permanent magnets of the rotor.

20 Claims, 4 Drawing Sheets

Figure 1:
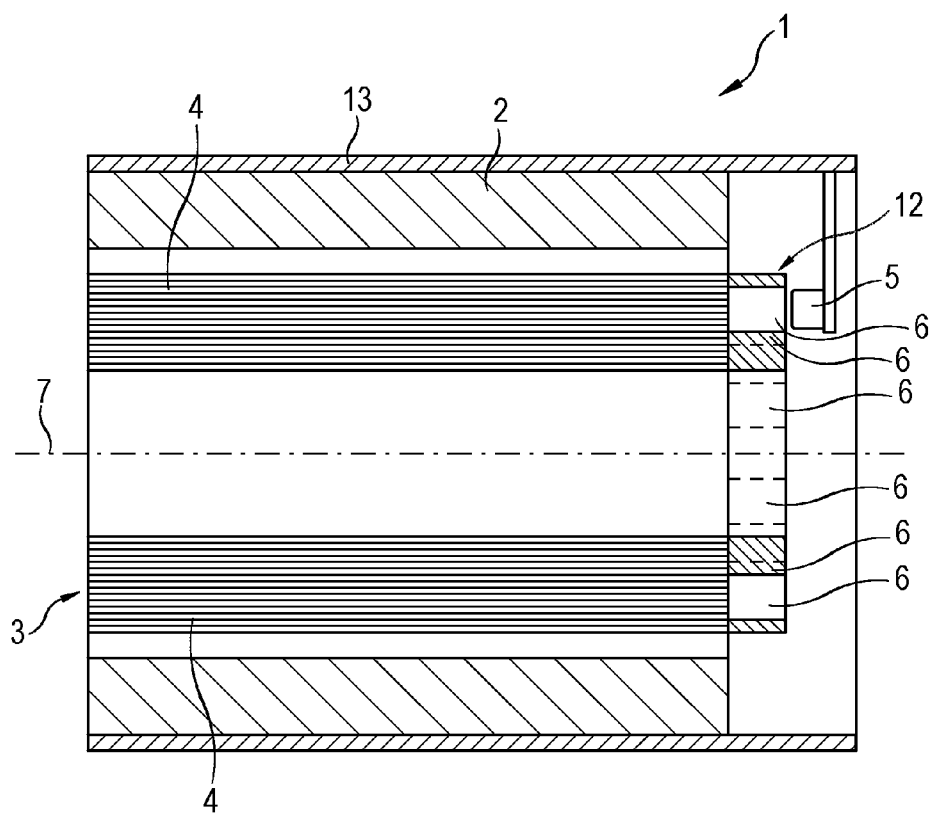

(51) Int. Cl.
*H02K 29/08* (2006.01)
*H02K 1/27* (2006.01)

(58) Field of Classification Search
USPC .............................. 310/156.01–156.84, 68 B
See application file for complete search history.

(56) References Cited

U.S. PATENT DOCUMENTS

| | | |
|---|---|---|
| 2001/0015582 A1 | 8/2001 | Nakajima |
| 2014/0175957 A1 | 6/2014 | Tang et al. |
| 2015/0214811 A1* | 7/2015 | Nishidate ................. H02K 5/22 |
| | | 310/68 B |

FOREIGN PATENT DOCUMENTS

| | | |
|---|---|---|
| DE | 10 2008 002 180 A1 | 12/2009 |
| EP | 1 124 309 A2 | 8/2001 |
| EP | 1 542 344 A1 | 6/2005 |
| JP | 2004-129456 A | 4/2004 |
| WO | WO 2005/119888 A1 | 12/2005 |

* cited by examiner

US 10,069,383 B2

ELECTRONICALLY COMMUTED ELECTRIC MOTOR WITH DIRECT SAMPLING OF THE MAGNETIC FIELD OF THE ROTOR

The present invention relates to an electronically commuted electric motor with direct sampling of the magnetic field of the rotor according to the generic term of the independent Claim 1. An electric motor according to this category comprises a stator and a rotor that has multiple permanent magnets that are arranged in a distributed way in the circumferential direction and that determine the magnetic field of the rotor. Further, the electric motor has a sensor that enables recording of the position or the speed of the rotor through direct sampling of the magnetic field of the rotor, whereby the sensor is spaced from the stator in a way that the stator field is only recorded to a low extent and preferably not at all by the sensor. Magnetic flux-guiding elements are disposed on the front side of the rotor, which move with the rotor and which guide at least a part of the magnetic field of the rotor to the sensor.

For commutation of brushless electric motors with a permanent magnet rotor, it is required to detect the rotor position. For this purpose, either an additional control magnet that is fastened on the rotor can be sampled. Alternatively, it is possible to sample the permanent magnet(s) of the rotor directly. The direct sampling offers the advantage that less installation space is usually required and, above all, that costs for the additional control magnet can be saved. However, direct sampling comes with the disadvantage that the stator field frequently causes a substantial interference during sampling. At the same time, sampling of the magnetic field of the rotor always leads to certain sampling of the stator field, which can lead, in particular in case of high stator currents, to the signals of the sensor used and/or the commutation signals calculated on their basis becoming useless.

Multiple solutions are known from the state of the art in which the position of the sensor is shifted in an outward direction away from the stator in order to reduce the impact of the stator field.

The DE 29802297 U1 deals with a brushless direct current motor with an internal rotor in which sampling of the rotor is shifted to the outside. The positioning of the sensors close to the rotor would have the disadvantage of additional contacting to a control board, on which the commutation electronics is installed, being required. To solve this problem, it is to be provided according to DE 29802297 U1 that the Hall sensors are installed on a control board that is disposed at a distance from the rotor and that they are connected to the magnetic field of the rotor through magnetically conductive insert parts. Through the insert parts, a part of the magnetic field that escapes at the rotor is conducted to the commutation transmitters formed by Hall sensors. As the field strength at the end of the insert parts is lower than directly at the rotor, appropriately sensitive sensors are used. In the solution known from the DE 29802297 U1, the magnetically conducting insert parts are disposed in a fixed way in relation to the bearing.

The EP 1542344 A1 also deals with sampling of the magnetic field of the rotor. The magnetic field of the rotor magnet is guided to a sensor, which is disposed outside of the stator when viewed from an axial direction, by means of a conductor that is at least in part magnetically soft. The magnetically soft conductor is disposed either in the air gap between the rotor and the stator or in a tooth space of the stator at the external circumference of the rotor magnet. Also in this solution, the magnetically soft conductor does not rotate along with the rotor.

Likewise, the WO 2005119888 A1 shows a brushless direct current motor in which sampling of the magnets of the rotor is ensured by means of multiple magnetic flux-guiding elements, which, however, do not rotate along with the rotor but which are fixed on the stator.

Also the DE 102007060241 A1 shows a solution in which the flux-guiding elements are disposed in a fixed way in relation to the bearing. A yoke will be formed through the flux-guiding element to guide the rotor flux between opposing poles of the magnet of the rotor.

In the mentioned solutions with flux-guiding elements that are fixed in relation to the bearing, not only a part of the magnetic field of the rotor but also a part of the stator field is always transferred to the sensors. The susceptibility to interference is therefore relatively high for these solutions.

The DE 2008002180 A1 shows a motor with a diametrically magnetized rotor magnet. The stray field of the rotor magnet is guided outwards to a Hall sensor through a sleeve-shaped magnetically soft coupling element that encloses the rotor shaft.

The JP 2004129456 shows an electric motor according to the category. It also deals with improving the detection of the rotor position. To reduce the influence of the stator field, the sensors are disposed in a radially spaced position from the stator. The rotor comprises a core made of a laminated stack of metal sheets. The rotor magnets are inserted in continuous recesses of the core. On one end, the rotor is finished by a non-magnetic steel plate. Magnetic flux-guiding elements are inserted in the steel plate, which transfer the magnetic field of the magnets of the rotor to magnetic elements that are in turn sampled by the sensors. The magnetic flux-guiding elements are, viewed in the circumferential direction, disposed in an identical position as the rotor magnets. They should be positioned as closely as possible to the stator. An impact by the magnetic field of the stator therefore exists in this solution as well.

The EP 1124309 A2 shows a motor with a rotor that has a core made of a laminated stack of metal sheets. Multiple permanent magnets, respectively with an alternating magnetization direction, are integrated in the core. The rotor structure is finished on the end by a non-magnetic plate. At the same position as the permanent magnets when viewed in a circumferential direction, smaller plates of magnetic material are disposed on or in the non-magnetic plate. These small plates are sampled by a Hall sensor. Also in the electric motor known from EP 1124309 A2, an interference of the sampling process by the stator field is not ruled out completely.

The purpose of the present invention is to improve the electronically commuted electric motor of the type according to the category in a way that an interference of the direct sampling of the magnetic field of the rotor by the stator field is further reduced.

This problem is solved by the features of the independent claim 1. According to this claim, there will be a solution to this problem according to the invention in an electronically commuted electric motor of the type according to the category if the flux-guiding elements, viewed in the circumferential direction of the rotor, are each positioned between two permanent magnets of the rotor.

Due to this, a significantly improved transfer of the magnetic field of the rotor to the sensor used or the sensors used is achieved. The permanent magnets of the rotor are preferably disposed at equal distances from each other in a row. The same also applies preferably to the positioning of the flux-guiding elements. Viewed in the circumferential direction of the rotor, each of the flux-guiding elements is further preferably positioned centrally between respectively two permanent magnets of the rotor. The number of the poles of the rotor corresponds to the number of the permanent magnets. Adjacent permanent magnets are polarized respectively opposite to each other. The rotor is preferably designed as an internal rotor.

Preferred embodiments of the present invention are the object of the sub-claims.

In a particularly preferred embodiment of the present invention, it is provided that the magnetization direction of each of the permanent magnets is essentially perpendicular to a radial direction of the rotor. Thereby, an optimal transfer of the magnetic field of the rotor through the flux-guiding elements is ensured. The permanent magnets are preferably disposed around the axis of the rotor in a spoke-shaped way. Further preferably, the height of the permanent magnets measured in a radial direction of the rotor is greater than the width of the permanent magnets measured perpendicularly to such height. The height of a permanent magnet thereby corresponds to the length of a spoke, the width of the permanent magnet corresponds to the thickness of the spoke.

In a further particularly preferred embodiment of the present invention, a magnetically soft iron core of the rotor is disposed respectively between two adjacent permanent magnets, whereby each flux-guiding element, viewed in the circumferential direction, is positioned centrally on one of the magnetically soft iron cores. Due to this, optimal guiding of the magnetic field to the sensors is ensured. The permanent magnets preferably have a uniform width, whereby the magnetically soft iron cores in a plane that is perpendicular to the axis of the rotor have a sector-shaped and/or wedge-shaped cross-section. Permanent magnets with a uniform width can be manufactured relatively easily and economically. Due to the wedge-shaped iron cores, the magnetic field of the permanent magnets is optimally influenced. Further preferably, as many flux-guiding elements as magnetically soft iron cores are to be provided.

In a further particularly preferred embodiment of the present invention, the maximum width of the flux-guiding elements measured in the circumferential direction of the rotor corresponds to the width of the associated magnetically soft iron core at the respective place that is also measured in the circumferential direction of the rotor. Thereby, a high concentration of the magnetic field is achieved in the flux-guiding elements. This ensures at the same time a good sensor signal strength.

In a further preferred embodiment of the present invention, the flux-guiding elements are formed in a pin-shaped way, whereby the axes of the flux-guiding elements are aligned in parallel to the axis of the rotor. Also this embodiment ensures an optimal transfer of the magnetic field to the sensors. The flux-guiding elements thereby preferably have a circular cross-section. Hence, they are formed preferably in a cylindrical way. In this embodiment, the flux-guiding elements can be manufactured economically. Alternatively, the flux-guiding elements can also have a rectangular cross-section or a longish oval cross-section. In the latter case, particularly good guiding of the magnetic field can be achieved if the larger main axis of the oval cross section is aligned radially in relation to the axis of the rotor. Further preferably, the length of the pins is equivalent to their diameter.

In a further preferred embodiment of the present invention, the flux-guiding elements are formed in a magnetically soft way. However, it is also possible to use magnetically hard flux-guiding elements. Particularly preferably, the flux-guiding elements are made of magnetically soft steel.

In a further preferred embodiment of the present invention, the flux-guiding elements are embedded in recesses of a plastic shell that comprises preferably the overall rotor. In this embodiment, a relatively simple and cost-efficient as well as accurate positioning of the flux-guiding elements is achieved. The plastic shell can be manufactured particularly economically with an injection-molding method.

In an alternative embodiment, the flux-guiding elements are integrated in recesses of a non-magnetic disk that is disposed on the front side of the rotor. It will be particularly advantageous if the disk forms an axial lock for the permanent magnets and for the iron cores by means of finishing the rotor in an axial direction. In this case, the disk has a double function. It is further particularly preferred in this context that the disk represents at the same time a balancing disk of the rotor. Thereby, the structure of the rotor module will be kept particularly compact. Balancing of the rotor occurs by means of systematic material removal on the external circumference of the disk. The flux-guiding elements integrated in the recesses of the disk therefore have to be positioned as far away from the external circumference of the disk as to be not impacted by the balancing process. The non-magnetic disk is manufactured preferably of a non-magnetic metal, particularly preferably of non-magnetic steel.

In a further preferred embodiment of the present invention, the flux-guiding elements are kept magnetically in the recesses of the plastic sleeve and/or in the recesses of the non-magnetic disk. In this embodiment, there will be a relatively simple and cost-efficient assembly. To improve the stability of the flux-guiding elements, it can be provided that the flux-guiding elements are glued to the plastic sleeve or to the non-magnetic disk.

In a further particularly preferred embodiment of the present invention, the distance between a flux-guiding element and the respective adjacent permanent magnets between which the flux-guiding element is disposed amounts to 2 mm or less, preferably even 1 mm or less. This way, optimal guiding of the magnetic field is achieved. Further preferably, the distance between the flux-guiding element and the sensor amounts to 2 mm or less, preferably 1 mm or less. Optimal sampling by the sensor is thereby ensured.

In a further preferred embodiment of the present invention, the sensor is a Hall sensor.

In a further preferred embodiment of the present invention, the flux-guiding elements are arranged either as far outwards as possible or as far inwards as possible in relation to the axis of the rotor.

Preferred embodiments of the present invention will be explained in greater detail by means of drawings in the following.

Figure 2:
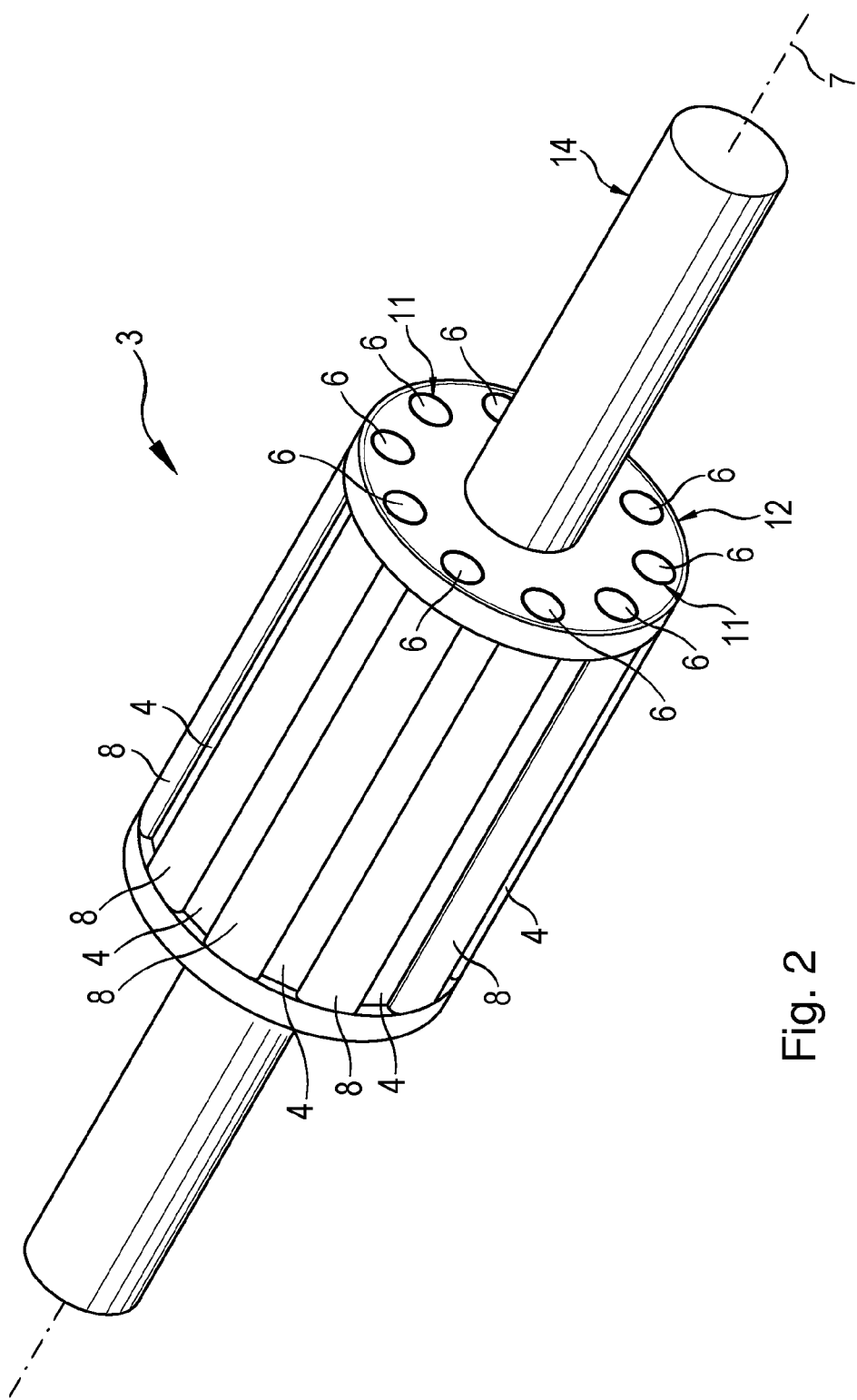
Figure 3:
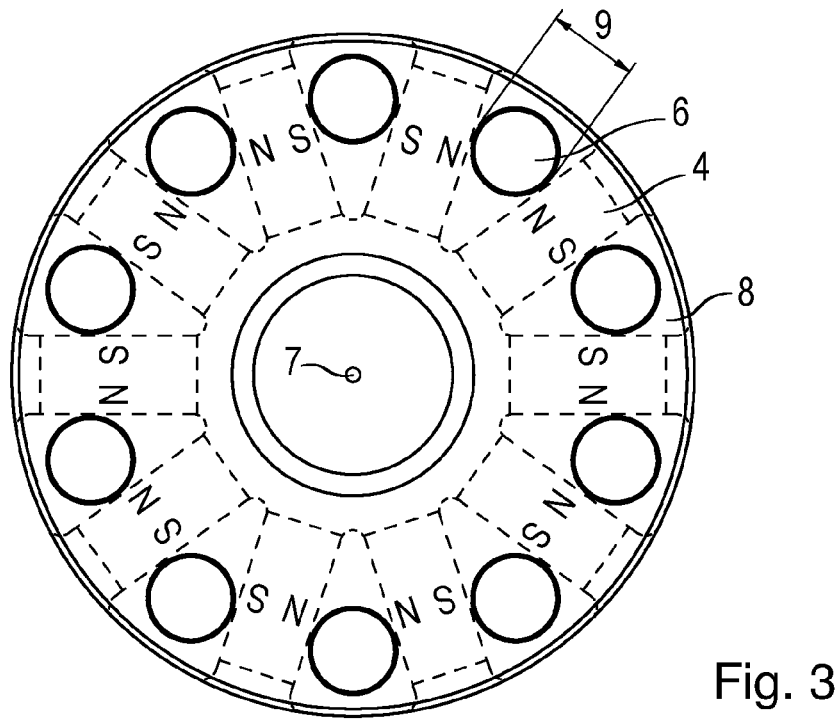
Figure 4:
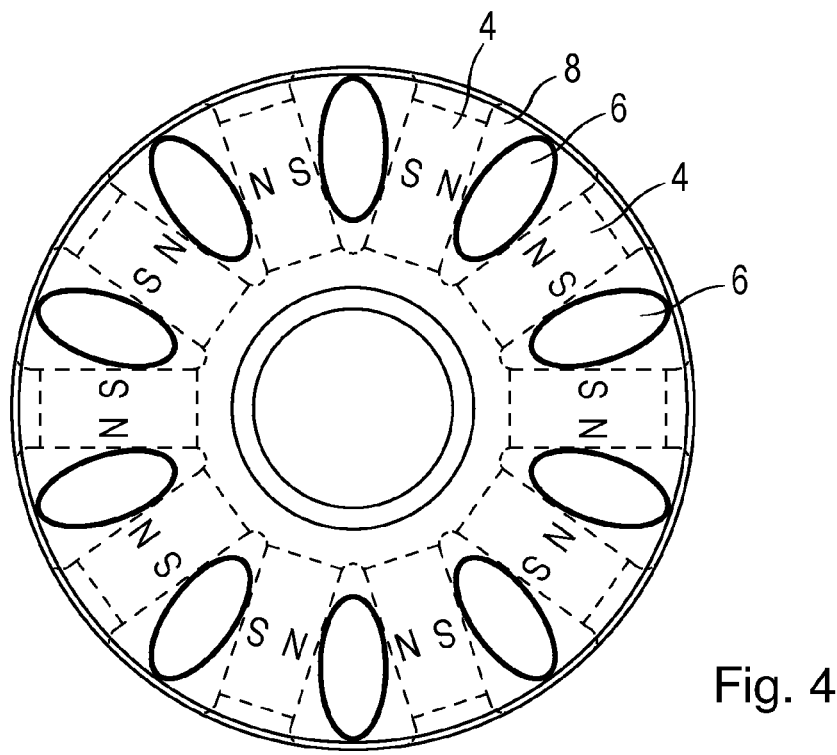
Figure 5:
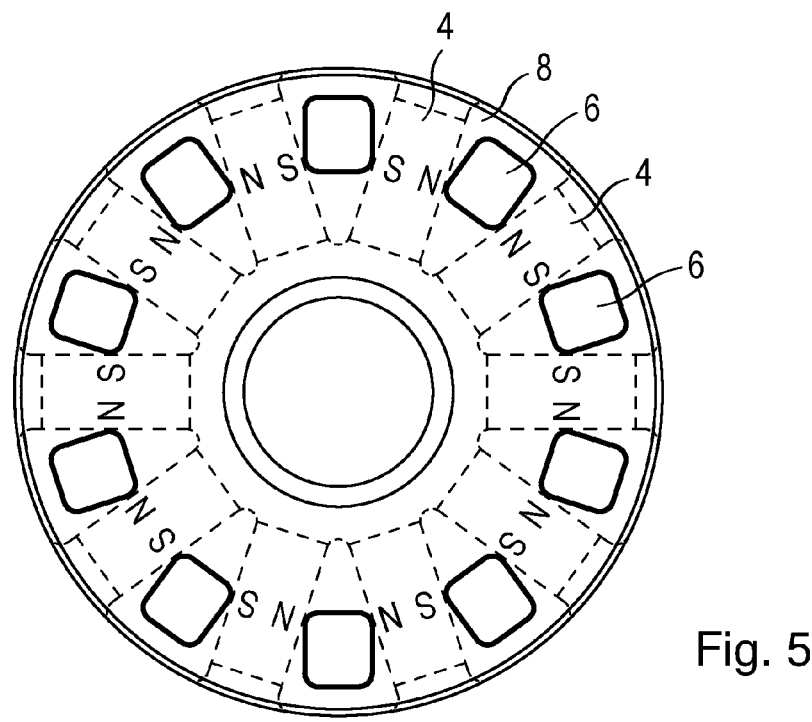
Figure 6:
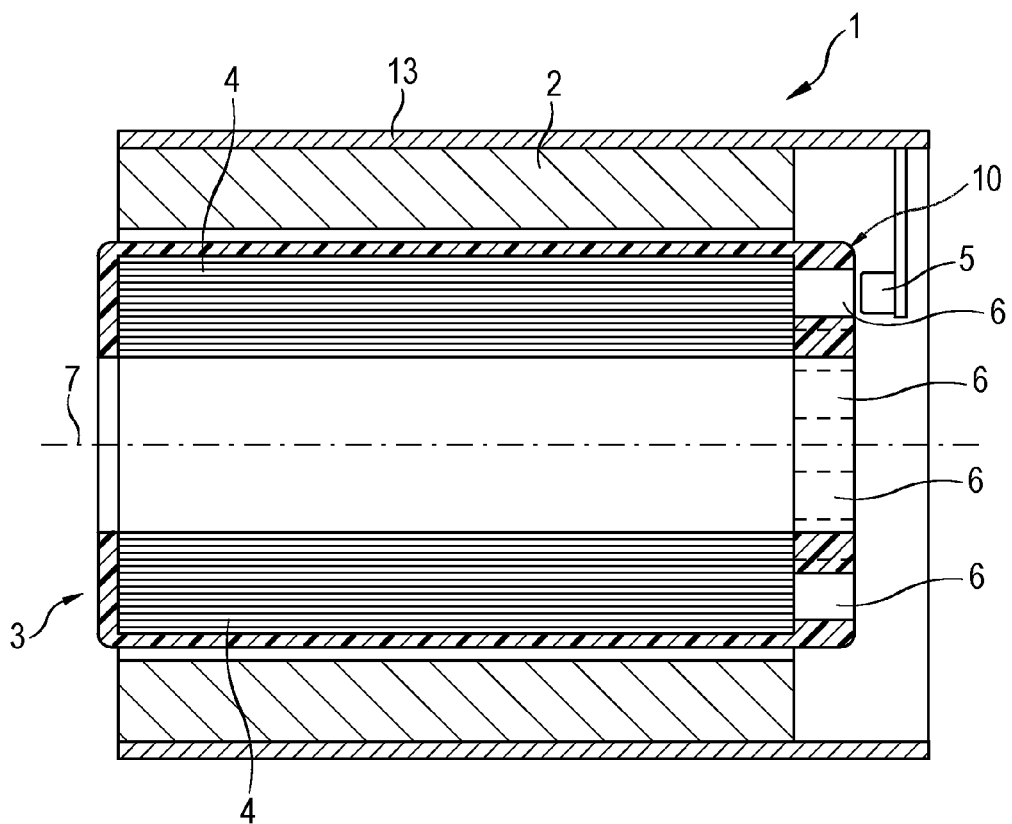

The drawings show:

FIG. 1: a longitudinal section of an electronically commuted electric motor according to the invention, FIG. 2: the rotor of the electric motor according to the invention from FIG. 1 in an oblique view, FIG. 3: an axial view of the rotor from FIG. 2, FIG. 4: the view from FIG. 3 with an alternative version of the flux-guiding elements of the rotor, FIG. 5: the view from FIG. 4 with a further alternative version of the flux-guiding elements, and FIG. 6: a longitudinal section of an electronically commuted electric motor according to the invention in accordance with a further embodiment of the present invention.

For the following embodiments, equal parts are designated with equal reference signs. If reference signs, which are not addressed any further in the pertaining description of Figures, are contained in a drawing, reference shall be made to preceding or following descriptions of Figures.

FIG. 1 shows a longitudinal section of an electronically commuted electric motor 1 according to the invention in accordance with a first embodiment. The electric motor 1 has an external hollow cylindrical stator 2 as well as a rotor 3 that is designed as an internal rotor. The rotor is illustrated in greater detail in FIG. 2. In this display, also the shaft 14, whose display has been omitted in FIG. 1 for reasons of clarity, is shown. An axial top view of the rotor is shown in FIG. 3.

The rotor has several permanent magnets 4 that are disposed in a spoke-shaped way and with an equal distance to each other in relation to the axis 7 of the rotor. As can be seen in FIG. 3, the magnetization direction of each of the permanent magnets is essentially perpendicular to a radial direction of the rotor. Adjacent permanent magnets thereby have an opposite magnetic polarity. There is respectively one magnetically soft iron core 8 between adjacent permanent magnets. It can be seen in FIG. 3 that the height of the permanent magnets measured in the radial direction of the rotor is greater than the measured width of the permanent magnets that is perpendicular to such height. The height of a permanent magnet practically corresponds to the length of a spoke, the width of the permanent magnet corresponds to the thickness of a spoke. As the permanent magnets have a uniform width, the cross-section of the magnetically soft iron cores is sector-shaped and/or wedge-shaped.

On the front end of the rotor on the right in FIG. 1, multiple magnetic flux-guiding elements 6 are disposed whose purpose is to transfer the magnetic field of the rotor to a Hall sensor 5 that is disposed outside of the stator in an axial direction and that is firmly connected to the bearing 13 of the electric motor. The position of the rotor is recorded through the Hall sensor. The sensor signals are used for commutation of the stator field. The flux-guiding elements are disposed on a circle whose center is located on the axis 7 of the rotor. FIG. 3 shows that each of the flux-guiding elements, viewed in the circumferential direction of the rotor, is disposed between two adjacent permanent magnets 4. The flux-guiding elements 6 are practically positioned centrally on the iron cores 8 located in between. The width 9 of the flux-guiding elements corresponds to the width of the iron cores at the respective distance from the axis 7 of the rotor. In the displayed embodiment, the magnetic flux-guiding elements 6 are formed cylindrically. Therefore, they have a circular cross-section. However, other cross-sections are also possible. A longish oval cross-section as illustrated in FIG. 4 is particularly advantageous. In this embodiment, the magnetic field of the permanent magnets 4 is transferred optimally to the sensor. FIG. 5 shows a further embodiment in which the flux-guiding elements 6 have a rectangular cross-section. Further, it can be seen in FIG. 1 that the axes of the flux-guiding elements are aligned in parallel to the axis 7 of the rotor and that the length of the flux-guiding elements corresponds approximately to their diameter.

In the embodiment that is shown in the FIGS. 1 to 3, the flux-guiding elements are integrated in recesses 11 of a non-magnetic steel disk 12. The steel disk 12 finishes the rotor on one side and is used at the same time for axial fastening of the permanent magnets 4 and the magnetically soft iron cores 8. Further, the steel disk 12 can also be used as a balancing disk of the rotor. To balance the rotor, material is removed respectively at an appropriate place on the external circumference of the disk, for example by means of a laser. Therefore, it is required for the flux-guiding elements 6 to have a sufficient distance to the external circumference of the disk.

Through the magnetic forces that are caused by the permanent magnets 4 and that impact on the flux-guiding elements 6, the flux-guiding elements are already maintained in situ in the recesses 11 of the disk 12. To improve stability, it can be provided that the flux-guiding elements are glued to the disk.

To ensure optimal sampling of the magnetic field of the rotor by the sensor 5, the distance between a flux-guiding element and the respective adjacent rotor magnets as well as the distance between the flux-guiding element and the sensor have to be kept as low as possible. The unobstructed distance between the flux-guiding elements and the Hall sensor 5 amounts in the embodiment to less than 1 mm. As the width 9 of the flux-guiding elements corresponds to the width of the magnetically soft iron cores 8 at the respective place, there is no distance between the flux-guiding elements and the respective adjacent permanent magnets 4.

A further embodiment is shown in FIG. 6 in which the flux-guiding elements 6 are not integrated in a non-magnetic steel disk but in a plastic sleeve 10 that is formed as a plastic overmold and that encloses the rotor.

Of course, several sensors can be provided for instead of an individual sensor 5. The sensors can for example be positioned at different positions in the circumferential direction. Instead of Hall sensors, also other sensors that are suitable to detect the magnetic field of the rotor can be used.

The invention claimed is:

1. An electronically commuted electric motor comprising:
   a stator and a rotor that has several permanent magnets that are disposed in a distributed way in a circumferential direction and that determine a rotor magnetic field;
   at least one sensor that makes a position or a speed of the rotor detectable through direct sampling of the rotor magnetic field, whereby the sensor is spaced from the stator in a way that a stator field is only detected to a minor extent or not at all by the sensor; and
   magnetic flux-guiding elements arranged to move along with the rotor and guide at least a part of the magnetic field of the rotor to the sensor, and being disposed on one front side of the rotor, wherein the flux-guiding element, viewed in a circumferential direction of the rotor are each positioned centrally between two permanent magnets of the rotor.

2. The electronically commuted electric motor according to claim 1, wherein a magnetization direction of each of the permanent magnets is substantially perpendicular to a radial direction of the rotor.

3. The electronically commuted electric motor according to claim 1, wherein a magnetically soft iron core of the rotor is disposed respectively between two adjacent permanent magnets, whereby each flux-guiding element viewed in the circumferential direction of the rotor is positioned centrally on one of the magnetically soft iron cores.

4. The electronically commuted electric motor according to claim 3, wherein a measured maximum width of the flux-guiding elements measured in the circumferential direction of the rotor corresponds to a measured width of a pertaining magnetically soft iron core that is also measured in the circumferential direction of the rotor.

5. The electronically commuted electric motor according to claim 1, wherein the flux-guiding elements are pin-shaped, whereby axes of the flux-guiding elements are aligned in parallel to an axis of the rotor.

6. The electronically commuted electric motor according to claim 5, wherein the flux-guiding elements have a circular cross-section.

7. The electronically commuted electric motor according to claim 5, wherein a length of the flux-guiding elements corresponds to their diameter.

8. The electronically commuted electric motor according to claim 1, wherein the flux-guiding elements are magnetically soft.

9. The electronically commuted electric motor according to claim 8, wherein the flux-guiding elements are made of magnetically soft steel.

10. The electronically commuted electric motor according to claim 1, wherein the flux-guiding elements are embedded in recesses of a plastic sleeve that encloses the rotor.

11. The electronically commuted electric motor according to claim 10, wherein the flux-guiding elements are held magnetically in the recesses of the plastic sleeve and/or non-magnetic disk.

12. The electronically commuted electric motor according to claim 10, wherein the flux-guiding elements are glued to the plastic sleeve and/or the non-magnetic disk.

13. The electronically commuted electric motor according to claim 1, wherein the flux-guiding elements are integrated in recesses of a non-magnetic disk that is disposed on the front side of the rotor.

14. The electronically commuted electric motor according to claim 13, wherein the disk forms an axial lock for the permanent magnets and the iron cores by finishing the rotor in an axial direction.

15. The electronically commuted electric motor according to claim 13, wherein the disk is at the same time a balancing disk of the rotor.

16. The electronically commuted electric motor according to claim 13, wherein the disk is made of non-magnetic metal.

17. The electronically commuted electric motor according to claim 13, wherein the disk is made of non-magnetic steel.

18. The electronically commuted electric motor according to claim 1, wherein the distance between a flux-guiding element and the rotor magnets between which the flux-guiding element is disposed and the distance between the flux-guiding element and the sensor amounts to 2 mm or less.

19. The electronically commuted electric motor according to claim 1, wherein the sensor is a Hall sensor.

20. The electronically commuted electric motor according to claim 1, wherein the distance between a flux-guiding element and the rotor magnets between which the flux-guiding element is disposed and the distance between the flux-guiding element and the sensor amounts to 1 mm or less.

* * * * *